United States Patent
Stiglmair et al.

(10) Patent No.: US 10,927,736 B2
(45) Date of Patent: Feb. 23, 2021

(54) CATALYST BODY, ELECTRICALLY HEATED CATALYST AND MOTOR VEHICLE WITH A CATALYST

(71) Applicant: Faurecia Emissions Control Technologies, Germany GmbH, Augsburg (DE)

(72) Inventors: Manfred Stiglmair, Augsburg (DE); Axel Boehmer, Augsburg (DE); Ting Feng, Augsburg (DE); Matthias Hildebrand, Augsburg (DE); Jean-Francois Perret, Augsburg (DE)

(73) Assignee: Faurecia Emissions Control Technologies, Germany GmbH

( * ) Notice: Subject to any disclaimer, the term of this patent is extended or adjusted under 35 U.S.C. 154(b) by 0 days.

(21) Appl. No.: 16/666,694

(22) Filed: Oct. 29, 2019

(65) Prior Publication Data
US 2020/0131963 A1 Apr. 30, 2020

(30) Foreign Application Priority Data
Oct. 30, 2018 (DE) ...................... 10 2018 127 092.5

(51) Int. Cl.
| | | |
|---|---|---|
| *F01N 3/00* | (2006.01) | |
| *F01N 3/20* | (2006.01) | |
| *F01N 3/28* | (2006.01) | |
| *B01D 53/86* | (2006.01) | |

(52) U.S. Cl.
CPC ......... *F01N 3/2013* (2013.01); *F01N 3/2889* (2013.01); *B01D 53/8631* (2013.01)

(58) Field of Classification Search
CPC .... F01N 3/2026; F01N 3/2803; F01N 3/2013; F01N 3/2889; B01D 53/8631
USPC ............................................................ 60/286
See application file for complete search history.

(56) References Cited

U.S. PATENT DOCUMENTS

| | | | | |
|---|---|---|---|---|
| 4,523,935 A | * | 6/1985 | Takagi ............... | B01D 39/2093 219/205 |
| 5,370,943 A | * | 12/1994 | Bruck ................... | F01N 3/2026 428/593 |
| 5,582,805 A | * | 12/1996 | Yoshizaki ............. | F01N 3/2026 422/174 |
| 5,672,324 A | * | 9/1997 | Okamoto ............... | F01N 3/2026 422/174 |
| 2003/0017086 A1 | * | 1/2003 | Bruck ................... | F28D 20/023 422/168 |
| 2008/0229931 A1 | * | 9/2008 | Katsuyama ........ | B01D 46/0078 96/417 |
| 2010/0133251 A1 | * | 6/2010 | Konieczny ........... | B01D 46/525 219/202 |

(Continued)

FOREIGN PATENT DOCUMENTS

| | | |
|---|---|---|
| DE | 4102890 A1 | 1/1991 |
| DE | 102007024563 A1 | 11/2008 |
| WO | 9213636 A1 | 8/1992 |

*Primary Examiner* — Jason D Shanske
(74) *Attorney, Agent, or Firm* — Carlson, Gaskey & Olds, P.C.

(57) ABSTRACT

A catalyst body for an electrically heated catalyst has an electrical contacting assembly, which is arranged on the catalyst body and comprises an electrical conductor embedded in the catalyst body and extending in a longitudinal direction of the catalyst body and at least up to one end face of the catalyst body.

12 Claims, 2 Drawing Sheets

(56) References Cited

U.S. PATENT DOCUMENTS

| | | | | |
|---|---|---|---|---|
| 2011/0158870 | A1* | 6/2011 | Hodgson | F01N 3/2026 |
| | | | | 423/210 |
| 2013/0025267 | A1* | 1/2013 | Yoshioka | F01N 3/2026 |
| | | | | 60/300 |
| 2013/0259759 | A1* | 10/2013 | Brueck | F01N 13/0097 |
| | | | | 422/169 |
| 2014/0165541 | A1* | 6/2014 | Nagel | F01N 3/2026 |
| | | | | 60/300 |
| 2015/0285117 | A1* | 10/2015 | Yoshioka | F01N 3/2853 |
| | | | | 73/114.75 |
| 2016/0061081 | A1* | 3/2016 | Ogimura | F01N 13/1838 |
| | | | | 422/174 |
| 2016/0243500 | A1* | 8/2016 | Omiya | B01D 53/94 |
| 2016/0271561 | A1* | 9/2016 | Nakayama | F01N 13/18 |
| 2019/0299200 | A1* | 10/2019 | Takase | B01J 21/06 |

\* cited by examiner

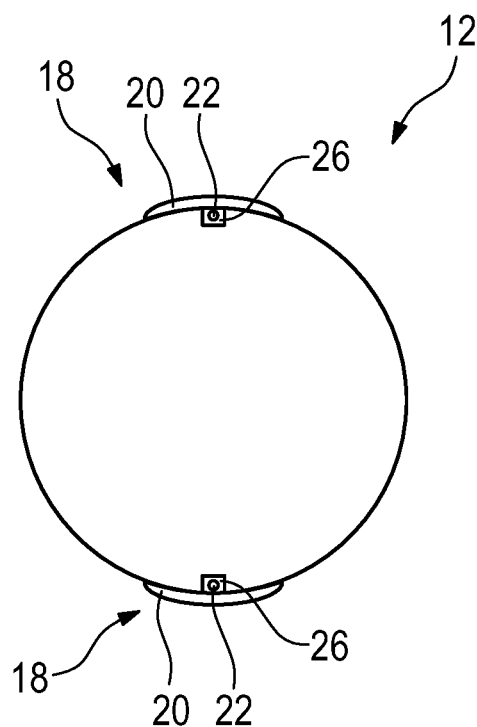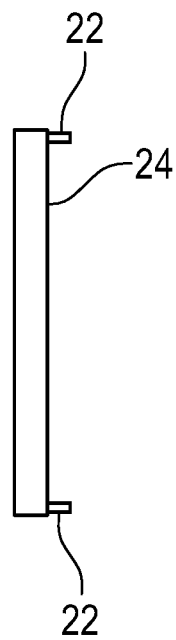
Fig. 1a  Fig. 1b
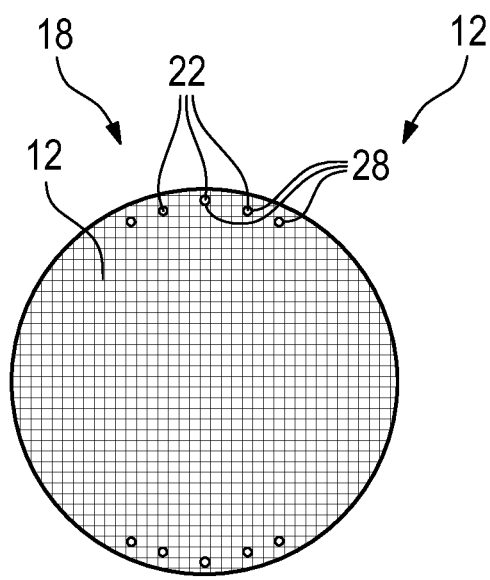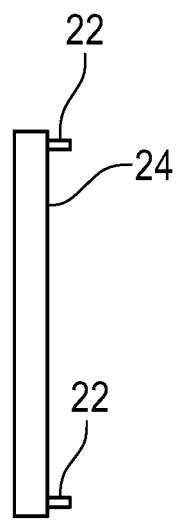
Fig. 2a  Fig. 2b

CATALYST BODY, ELECTRICALLY HEATED CATALYST AND MOTOR VEHICLE WITH A CATALYST

CROSS-REFERENCE TO RELATED APPLICATIONS

This application is a U.S. non-provisional application claiming the benefit of German Application No. 10 2018 127 092.5, filed on Oct. 30, 2018, which is incorporated herein by its entirety.

TECHNICAL FIELD

The invention relates to a catalyst body, an electrically heated catalyst, and a motor vehicle with a catalyst.

BACKGROUND OF THE INVENTION

Catalysts are used in motor vehicles with combustion engines to clean pollutants, above all nitrogen oxides, out of the exhaust gas. For this purpose, the exhaust gas is passed through a catalyst body, in which the pollutants are deposited. In order to achieve a sufficient gas-cleaning action, the catalyst body must have a certain minimum temperature. As this minimum temperature is not immediately ready for example after a cold start, it is usual to heat the catalysts electrically. In this way, the cold-start behavior of a motor vehicle can be shortened and pollutants in the exhaust gas can thereby be reliably eliminated.

In this case, for heating purposes, electrodes are provided on a shell surface of a catalyst body. As these electrodes stick out laterally from the catalyst, however, they make it more difficult to install a housing around the catalyst body.

SUMMARY

An object is thus to contact a catalyst body such that the installation of the catalyst body in a housing is not impeded.

This is achieved by a catalyst body with the features of claim 1, an electrically heated catalyst with the features of claim 8, and a motor vehicle with the features of claim 10.

The core of the invention is that a catalyst body for an electrically heated catalyst has at least one electrical contacting assembly, which comprises an electrical conductor embedded in the catalyst body and extending in the longitudinal direction of the catalyst body and at least up to one end face of the catalyst body.

In this way, an end-face contacting of the catalyst body is possible. As the electrical conductor is embedded in the catalyst body, in addition an easy installation of the catalyst body in a housing is also possible. In particular, the contacting assembly does not impede the installation in the housing.

Preferably, the conductor is embedded in the catalyst body in such a way that it does not protrude or only slightly protrudes beyond a shell surface of the catalyst body.

According to an embodiment, the electrical conductor protrudes beyond at least one end face of the catalyst body. The conductor can thereby be particularly easily contacted, for example by a terminal or the like.

The electrical conductor being embedded in the catalyst body is, for example, not inherently stable. That means that the electrical conductor does not have any supportive function. Thereby, the conductor may be particularly thin and cost effective.

In an exemplary embodiment, the conductor runs along the shell surface of the catalyst body or with a small distance to the shell surface, in particular with a distance of less than 10 mm to the shell surface. Thereby, a particularly large proportion of the catalyst body can be heated.

For example, at least one groove extends in the catalyst body in the longitudinal direction, wherein the electrical conductor is arranged at least partly, in particular mostly, in the groove. Preferably, only the ends of the electrical conductor protruding beyond the end face are not arranged in the groove. A groove is easy to produce and in addition is easily accessible. This means that the electrical conductor can be easily laid into the groove from the outside.

The electrical contacting assembly can comprise a surface electrode, wherein the surface electrode at least partly covers the groove. In this way, the electrical conductor and the surface electrode can be in electrical contact. This can be achieved in particular in that the surface electrode is applied when the electrical conductor is already arranged in the groove.

The surface electrode comprises, for example, an electrode paste and/or a metal plate, which is adhered to the catalyst body. The metal plate can be a sheet which lies flat against the catalyst body or contacts the catalyst body in places via a plurality of contact elements which are bent out of the sheet. The contact elements are, for example, small metal bars which stick out from the surface electrode in the direction towards the catalyst body. In each case, the catalyst body is contacted over a large area by the surface electrode and can be heated in a suitable time.

In order to secure the electrical conductor durably and reliably to the catalyst body, the electrical conductor is, for example, adhered in the groove, in particular with an electrically conducting adhesive.

Alternatively, the electrical conductor can be held in the groove by the surface electrode, for example if the surface electrode is produced by an electrode paste. The electrode paste can then, among other things, be applied to an exposed surface of the electrical conductor, with the result that the electrical conductor is fixed in the catalyst body after the electrode paste has been cured. By the exposed surface of the electrical conductor is meant the surface of the electrical conductor which is visible in the catalyst body in a top view of the electrical conductor.

It is also conceivable that at least one channel is provided in the catalyst body, wherein the electrical conductor is arranged in the channel "Channel" here refers to a flow channel inside the catalyst body through which exhaust gas flows. This means that the channel is circumferentially closed and only open on its end faces.

According to an embodiment, the electrical conductor is elongate, in particular rod-shaped or a wire. Thus, the electrical conductor can be easily arranged in the groove or in a channel.

If a sufficiently thin and stable electrical conductor is used, it can be easily pushed into one of the channels already present anyway, and there is no need for a channel of its own to be formed for the conductor. In this way, the advantage is achieved that no separate work step is necessary in order to provide a suitable channel for the electrical conductor.

Preferably, several channels in the catalyst body are occupied by electrical conductors. The catalyst body can thereby be sufficiently strongly energized. For example, a contacting assembly comprises more than three, in particular five to ten electrical conductors.

The occupied channels are, for example, arranged at a short distance from the outer surface of the catalyst body, for example at a distance of less than 10 mm, particularly preferably at a distance of up to 5 mm A particularly large proportion of the catalyst body can thereby be heated. In particular, the catalyst is also heated in its edge area.

Two contacting assemblies, which are offset relative to each other by 180°, are preferably arranged on the catalyst body.

The object is furthermore achieved according to the invention by an electrically heated catalyst with a catalyst body, which is formed as previously described, and includes a housing at least circumferentially surrounding the catalyst body, wherein the catalyst is electrically contacted on the end face via the contacting assembly.

For example, both the catalyst body and the housing are cylindrical. In the past, this design became established. However, other designs are also conceivable.

According to an embodiment, the catalyst body is surrounded by an insulating mat. The insulating mat has a damping effect and protects the catalyst body from damage during driving operation. In addition, the catalyst body can be clamped in the housing by the insulating mat.

Because of the advantageous embodiment of the catalyst body, in particular because the electrical conductor is embedded in the catalyst body, no separate openings or impressions are necessary, either in the insulating mat or in the housing, in order to make it possible to install the catalyst body in the housing using the known production methods. For example, the catalyst body is pressed into the housing together with the insulating mat. Alternatively or additionally, the housing can be pressed around the catalyst body after the catalyst body and the insulating mat have been inserted into the housing.

BRIEF DESCRIPTION OF THE DRAWINGS

Further advantages and features of the invention emerge from the following description and the following drawings, to which reference is made. In the drawings there are shown in:

FIGS. 1a and 1b schematically show a catalyst body according to a first embodiment of the invention in a top view and a side view, FIGS. 2a and 2b schematically show a catalyst body according to a further embodiment of the invention in a top view and a side view.

DETAILED DESCRIPTION

Figure 3:
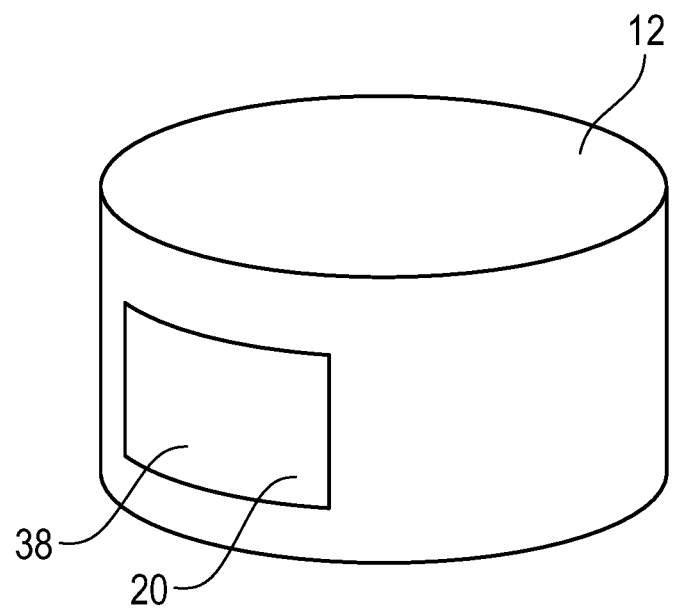
FIG. 3 shows a catalyst body with a surface electrode, and FIG. 4 schematically shows an electrically heated catalyst according to the invention.

FIGS. 1a and 1b schematically show a catalyst body 12 according to the invention in a top view and a side view, wherein the side view is represented shortened for the sake of simplicity.

The catalyst body 12 is, for example, a honeycomb body, in particular made of ceramic or of metal.

Two contacting assemblies 18, which are offset relative to each other by 180°, are provided on a shell surface of the catalyst body 12.

A contacting assembly 18 comprises in each case a surface electrode 20 and an electrical conductor 22.

The electrical conductor 22 is not inherently stable, which means that the conductor 22 does not have any support function.

The surface electrode 20 is arranged directly on the shell surface of the catalyst body 12. In the embodiment example shown, the surface electrode 20 is formed by an electrode paste, for example by a silver paste.

The electrical conductors 22 are embedded in the catalyst body 12 and extend in the longitudinal direction of the catalyst body 12 at least up to the end face of the catalyst body 12. As is shown in FIG. 1b, the electrical conductors 22 can extend beyond an end face 24 of the catalyst body 12.

The electrical conductors 22 are formed elongate, for example rod-shaped or as a wire.

In order to embed the electrical conductors 22 in the catalyst body 12, two grooves 26 extend in the catalyst body 12 in the longitudinal direction of the catalyst body 12. The grooves 26 are arranged offset relative to each other by 180°, precisely like the contacting assemblies 18.

An electrical conductor 22 is arranged in each groove 26, namely completely or almost completely inside the groove 26, in such a way that the electrical conductor 22 does not protrude or only minimally protrudes beyond an outer surface of the catalyst body 12.

In order to secure the electrical conductors 22 reliably in the groove 26, the electrical conductors 22 can in each case be adhered in a groove 26, in particular with an electrically conductive adhesive.

Alternatively, the electrical conductors 22 can be secured in the groove 26 by the electrode paste. This is achieved, among other things, in that the surface electrode 20 at least partly covers the groove 26.

FIGS. 2a and 2b illustrate a further embodiment of a catalyst body 12 according to the invention in a top view and a side view.

According to this embodiment, the catalyst body 12 has no groove 26, unlike the previously described embodiment.

In the embodiment represented in FIGS. 2a and 2b, several channels 28 are provided in the catalyst body 12, in particular circumferentially closed channels 28. Exhaust gas flows through these channels 28 during operation of an electrically heated catalyst 10.

In the embodiment example shown, several of these channels 28 are occupied by electrical conductors 22. The electrical conductors 22 extend at least up to the end face 24 of the catalyst body 12, in particular beyond the end face 24, for the purpose of the electrical contacting.

Such a catalyst body 12 can be particularly cost-effective.

The embodiments described in connection with FIGS. 1 and 2 can also be combined with each other.

FIG. 3 shows a catalyst body 12 in which, instead of the surface electrode 20 made of an electrode paste illustrated in FIG. 1, a surface electrode 20 made of a metal plate 38 is illustrated. The metal plate 38 is, for example, adhered to the catalyst body 12. According to a further embodiment, such a surface electrode 20 can be used instead of the surface electrode 20 shown in FIG. 1.

The catalyst bodies 12 shown in FIGS. 1 and 2 can likewise be used in an electrically heated catalyst 10 according to the invention.

Figure 4:
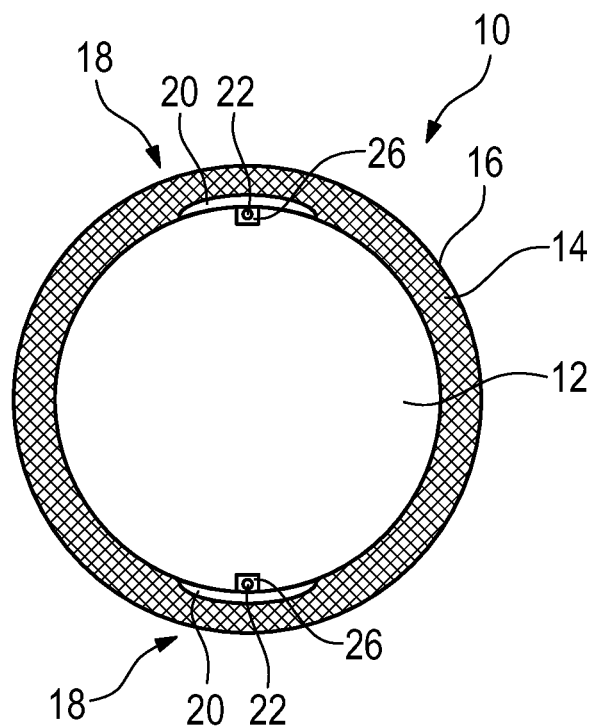

Such a catalyst 10 according to the invention with a catalyst body 12 according to FIG. 1 is illustrated in FIG. 4.

The catalyst body 12 is wrapped in an insulating mat 14 and pressed into a housing 16.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A catalyst body for an electrically heated catalyst comprising:

at least one electrical contacting assembly comprising an electrical conductor embedded in the catalyst body and extending in a longitudinal direction of the catalyst body and at least up to one end face of the catalyst body, and wherein the electrical conductor runs along a shell surface of the catalyst body or with a distance of less than 10 mm to the shell surface.

2. The catalyst body of claim 1 wherein the electrical conductor protrudes beyond at least one end face of the catalyst body.

3. The catalyst body of claim 1 wherein at least one groove extends in the longitudinal direction in the catalyst body, wherein the electrical conductor is arranged at least partly in the at least one groove.

4. The catalyst body of claim 3 wherein the at least one electrical contacting assembly comprises a surface electrode, wherein the surface electrode at least partly covers the at least one groove.

5. The catalyst body of claim 3 wherein the electrical conductor is adhered in the at least one groove.

6. The catalyst body of claim 1 wherein at least one channel is provided in the catalyst body, wherein the electrical conductor is arranged in the at least one channel.

7. The catalyst body of claim 1 wherein the electrical conductor is elongate.

8. An electrically heated catalyst with the catalyst body as defined in claim 1 and a housing at least circumferentially surrounding the catalyst body, wherein the electrically heated catalyst is electrically contacted on the end face via the at least one electrical contacting assembly.

9. The electrically heated catalyst as defined in claim 8 wherein the catalyst body is surrounded by an insulating mat.

10. A motor vehicle with the electrically heated catalyst as defined in claim 8.

11. A catalyst body for an electrically heated catalyst with at least one electrical contacting assembly, which comprises:

an electrical conductor embedded in the catalyst body and extending in a longitudinal direction of the catalyst body and at least up to one end face of the catalyst body, wherein at least one groove extends in the longitudinal direction in the catalyst body, wherein the electrical conductor is arranged at least partly in the at least one groove, wherein the at least one groove is an elongated recess in a shell surface of the catalyst body.

12. A catalyst body for an electrically heated catalyst with at least one electrical contacting assembly, which comprises:

an electrical conductor embedded in the catalyst body and extending in a longitudinal direction of the catalyst body and at least up to one end face of the catalyst body, wherein at least one groove extends in the longitudinal direction in the catalyst body, wherein the electrical conductor is arranged at least partly in the at least one groove, and a surface electrode being arranged on the catalyst body, wherein the surface electrode at least partly covers the at least one groove.

* * * * *